United States Patent [19]

Ingalsbe

[11] Patent Number: 4,968,260
[45] Date of Patent: * Nov. 6, 1990

[54] BIX BLOCK ADAPTER

[75] Inventor: David L. Ingalsbe, Hastings, Minn.

[73] Assignee: Independent Technologies, Inc., Omaha, Nebr.

[ * ] Notice: The portion of the term of this patent subsequent to Nov. 7, 2006 has been disclaimed.

[21] Appl. No.: 440,280

[22] Filed: Nov. 22, 1989

[51] Int. Cl.$^5$ .............................................. H05K 1/00
[52] U.S. Cl. ..................... 439/76; 439/638; 439/676; 439/696
[58] Field of Search ................ 439/55, 76, 78–83, 439/676, 344, 638, 650, 651, 652, 655, 712, 731, 752, 715, 696

[56] References Cited

U.S. PATENT DOCUMENTS

| | | | |
|---|---|---|---|
| 3,833,839 | 9/1974 | Debaight | 439/76 |
| 4,392,701 | 7/1983 | Weidler | 339/17 R |
| 4,651,340 | 3/1987 | Marson | 379/156 |
| 4,756,695 | 7/1988 | Lane et al. | 439/76 |
| 4,767,338 | 8/1988 | Dennis et al. | 439/76 |
| 4,878,849 | 11/1989 | Ingalsbe | 439/76 |

FOREIGN PATENT DOCUMENTS

WO83/03717 10/1983 PCT Int'l Appl. .

OTHER PUBLICATIONS

AT&T, Premises Distribution Products–Consumer Catalog p. 10.
AMP Incorporated, Modular Interconnection System Publication, pp. 734 and 735.

Primary Examiner—David L. Pirlot
Attorney, Agent, or Firm—Anthony G. Eggink; Joel D. Skinner

[57] ABSTRACT

A unitary, compact telecommunications interface adapter system. The adapter system comprises a bifurcated housing structure enclosing a modular connector and associated elements. The housing structure has a plug end constructed and arranged for connection to a BIX-type telecommunications interface. The adapter further has an internal printed circuit board interface between the modular connector and a plurality of contact blades which are connected to and which extend horizontally beyond the perimeter of the printed circuit board through channels to expose the blades for contact outside the housing structure at the plug end. The telecommunications interface adapter system additionally comprises a support structure which has top and bottom spacially parallel extension members integrally formed with the housing structure at the plug end and which are disposed respectively above and below the contact blades.

20 Claims, 5 Drawing Sheets

BIX BLOCK ADAPTER

BACKGROUND OF THE INVENTION

This invention relates to an electrical connector apparatus and more particularly to an electrical adapter device for use in the telephone industry. The device of this invention is particularly useful for electrically connecting a telephone industry BIX-type block or terminal to a modular plug.

Under present telecommunications industry practice, telephone networks are divided into a telephone company side and a customer premises side. The demarcation point between the two sides of the network is the point at which the responsibility for installation, maintenance and repair of telephone company and customer premises equipment is divided. The demarcation point typically comprises a multiple wire, plug-type terminal or interface which is located on the customer premises. An example of such a terminal or interface is the BIX-type block. As referred to in the industry, BIX-type blocks are in-building cross-connect systems manufactured under the "BIX" trademark by Northern Telecom Ltd. In this Application, these particular systems are referred to as "BIX blocks", and the invention as "BIX block adapters".

Complex interconnect wiring installations at BIX blocks have made cable identification and trouble isolation a more difficult and time consuming task for repair and installation technicians. Thus, there has arisen a need for a device which simplifies the connection of test or other telephone equipment to BIX blocks, and one which utilizes modular connectors. In the past, various devices have been used or proposed to adapt demarcation point and other connections to modular connectors, such as plugs and jacks. However, these devices have proven to be complex, expensive, unreliable, and difficult to use. And, these devices have generally not been usable with BIX blocks.

Still other adapter devices have been proposed and manufactured having specific mating structures for connection to particular block or terminal configurations. For example, Applicant's U.S. Pat. No. 4,878,848, issued on Nov. 7, 1989 describes an adapter structure for use with a 110-type block, and Applicant's allowed U.S. Pat. Application, Ser. No. 07/240,467, filed on Sept. 6, 1988 is for an adapter structure for use with a 66-type block. In contrast, the adapter structure of the present invention is designed for use with BIX blocks.

The BIX block adapter of the present invention provides a device which overcomes the shortcomings and disadvantages of the prior art. This invention provides a compact, durable, and reliable adapter which is simple and easy to use. The BIX block adapter provides a means of electrically connecting and adapting a BIX block to a modular jack for testing and other purposes.

SUMMARY OF THE INVENTION

The device of the present invention provides a unitary and compact telecommunications interface adapter. The adapter comprises a modular connection means, such as a modular jack, and a housing structure connected to the modular jack. The housing structure has a central cavity and a tapered, generally rectangular, planar plug end extended from the central cavity and having a receptacle structure for connection to the telecommunications interface. The adapter further has a plurality of electrical contact blades and a printed circuit board to electrically connect the modular jack and the contact blades. The modular jack and the printed circuit board are enclosed within the central cavity.

Preferably, the housing structure is a joined two-part structure having a top portion and a bottom portion which are preferably constructed of plastic, and joined via a sonic fusion process. The contact blades are preferably planar, upstanding and extend horizontally beyond the perimeter of the printed circuit board through a channel structure formed in the receptacle structure, so that they are exposed for contact with a BIX-type telecommunications interface.

The adapter preferably and additionally comprises means to support itself in operative connection to the telecommunications interface. The support means comprises top and bottom spacially parallel extension members integrally formed with the housing structure at the plug end and disposed respectively above and below the contact blades.

These and other benefits of this invention will become clear from the following description by reference to the drawings.

BRIEF DESCRIPTION OF THE DRAWINGS

FIGS. 8 A and B are top and bottom views, respectively, of an embodiment of the printed circuit board of the BIX block adapter;

FIGS. 9 A and B are top and bottom views, respectively, of another embodiment of the printed circuit board;

DESCRIPTION OF THE PREFERRED EMBODIMENT

The device of the present invention is used to adapt a BIX-type block or interface to a modular jack. BIX blocks are connected to and terminate telephone company lines at the customer's premises. This termination typically occurs at either the entrance cable leading into the premises or, for example, in the case of a multiple story building, at the end of a riser cable extending from the entrance cable (typically located on the ground floor) to an upper floor. The BIX block provides multiple connections for customer supplied telecommunications equipment (customer premises equipment) and the like.

Figure 1:
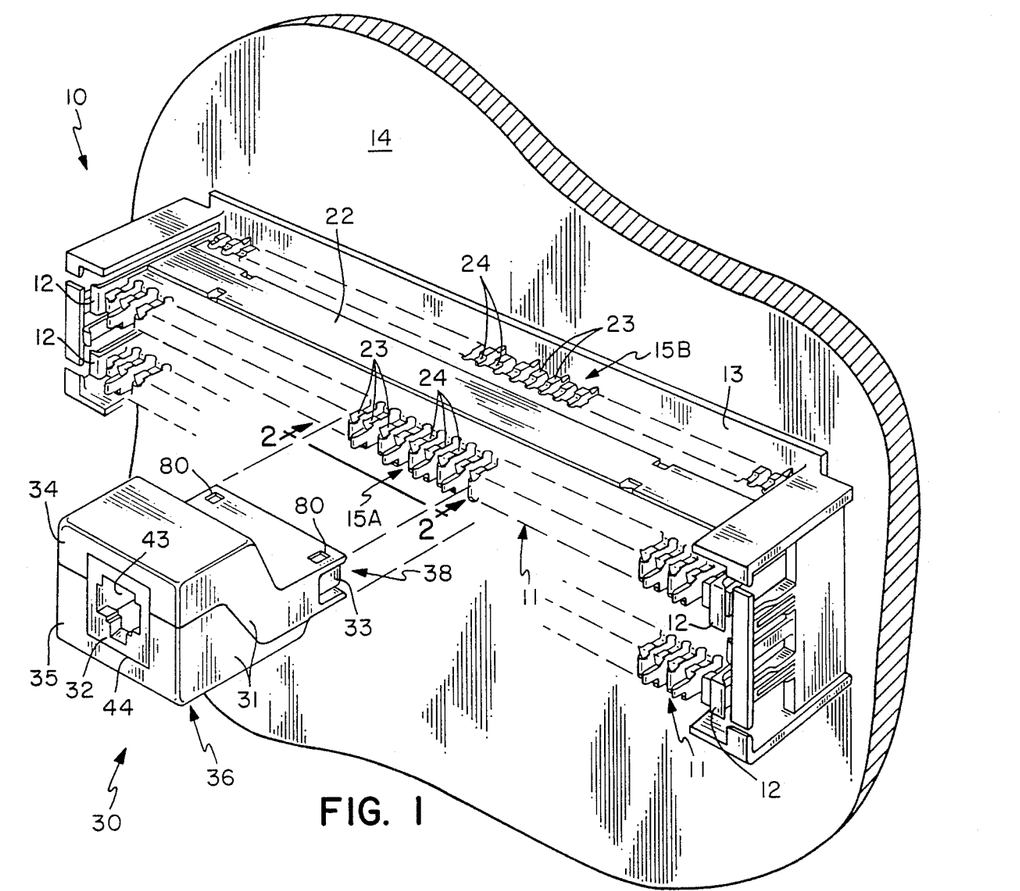
FIG. 1 is a perspective view of the BIX block adapter of the present invention, and shown in a position for connection to a BIX block.
Figure 2:
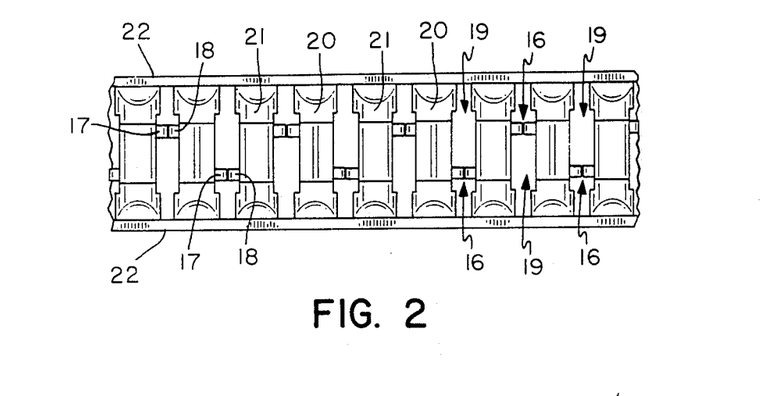
FIG. 2 is a frontal plan view of the connection portion of the BIX block shown in FIG. 1.

Referring to FIGS. 1 and 2, the BIX (In-Building Cross-Connect) system 10, produced by Northern Telecom Limited, is a modular system for cross-connecting pairs of telephone wires in residential and commercial buildings. The system includes one or more block assemblies 11 which are insertable into snap holders 12 generally located on the sides of a back mount 13 which is attached to a wall 14 or to a distributing frame. Although the mount 13 is shown having two sets or rows of block structures 11, mount structures having additional blocks and/or related hardware are also known and suited for the use of the adapter structure of this invention.

The BIX block structures 11 are thin, planar, molded plastic assemblies having identical and opposing connection portions or faces 15A and 15B located on opposing edges. The connection portions 15A and 15B each contain twenty-five (25) metal contacts or clips 16 spaced apart at predetermined intervals. The block assembly 11 exposes both ends of each contact 16 so that one end (exposed at 15B) may be hooked-up with premises interconnect wiring, and the opposite end (exposed at 15A) may be connected with an adapter or to telecommunications equipment. The contacts 16 are elongated, and split at each end so as to form twin spring beams 17 and 18. The beams 17 and 18 are expansible to create a slot for engaging a wire, and which displaces or strips its insulation to establish a bare metal connection. In use, telephone wires are inserted into the contacts 16 until they are pressed between the contact beams 17 and 18.

The contacts 16 are located in recessed interstitial sockets 19 which are formed between horizontal projections at the connection portions 15A and 15B. One type of projection, intra-pair splitters 20, are relatively long and separate two related contacts 16 which are associated with a wire pair. As known in the art, each wire pair corresponds to one telecommunications tip and ring line. A second type of projection, an inter-pair splitter 21, is shorter than the intra-pair splitters 20 and separates each pair of contacts 16 from adjacent pairs The projections 20 and 21 are cantilevered from the main body or housing 22 of the block assembly 10, and further aid in aligning an adapter or other telecommunications equipment with the respective sockets 19 for connection with the contacts 16.

Referring again to FIG. 1, the unitary adapter device 30 of the present invention is shown in a position for connection to the BIX block 11. The adapter 30 has a compact housing structure or case 31, an internal modular jack assembly 32, and a plurality of contact blades 33. The bifurcated housing 31 is preferably composed of molded ABS plastic or the like. As shown in the drawings, the housing 31 is comprised of an upper member 34 and a lower member 35 which mate. The upper and lower members 34 and 35 are joined preferably via a sonic fusion process known in the art. This housing structure 31 configuration and method of assembly is efficient and easy to manufacture, although additional configurations and methods of assembly are within the purview of this invention as, for example, the molding of a one-piece structure.

Figure 3:
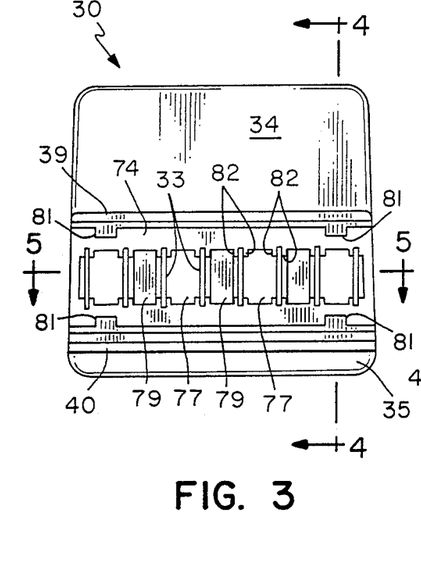
FIG. 3 is a frontal plan view of the BIX block adapter, and particularly showing its plug end portion.
Figure 4:
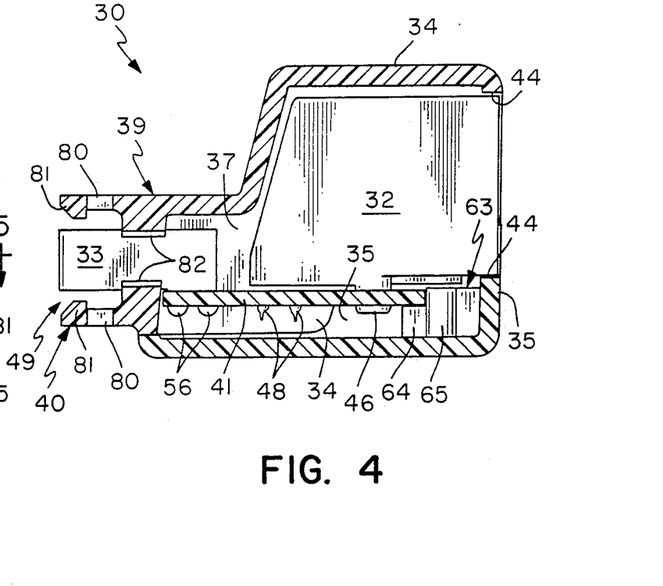
FIG. 4 is a cross-sectional view of the BIX block adapter shown in FIG. 3, taken along line 4—4.

The modular jack 32 is exposed at one end of the housing structure 31 for connection to the modular plug of a test apparatus or the like. The contact blades 33 are exteriorly exposed at the opposite end for direct connection to a BIX block 11. The housing 31 provides a compact structure which is easily connected or disconnected by the operator using one hand. The housing structure 31 further has a generally cube-shaped body 36, and an extended, rectangular, and tapered plug extension 38. The plug extension 38 further has opposing, planar, spacially separated, and parallel lip members 39 and 40 forming an interspace 49 as shown in FIGS. 3 and 4. In use, the plug extension 38 is connectible to a BIX block.

Figure 5:
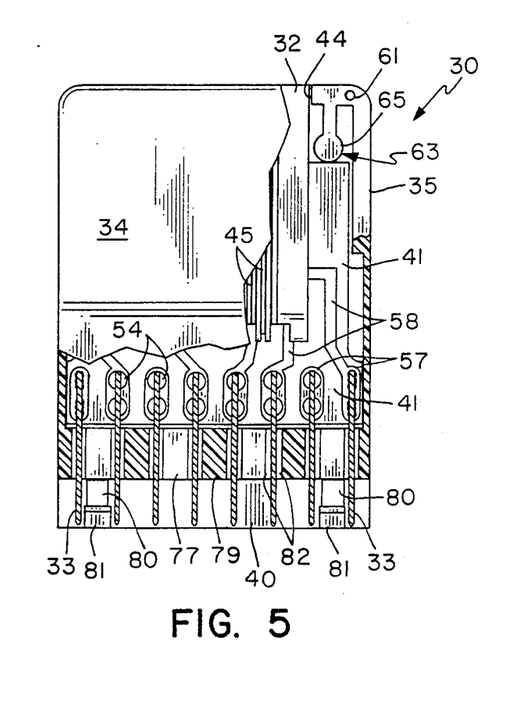
FIG. 5 is a top view of the BIX Block Adapter shown in FIG. 3, partially in cross section along line 5—5 thereof.

Referring also to FIGS. 3, 4 and 5, the housing structure 31 has an interior cavity 37, wherein the modular jack 32 and contact blades 33 are enclosed, and are communicatively connected to one another via a printed circuit board (PCB) interface 41. The PCB 41 is disposed adjacent and parallel to the bottom surface of the housing structure cavity 37. As further shown in the drawings, the dimensions of the cavity 37 are substantially coextensive with the dimensions of the modular jack assembly 32, contact blades 33 and PCB 41. A jack aperture 43 in the modular jack assembly 32 is exposed for connection to a modular plug at one end of the housing structure 31 via an aperture 44 in the housing structure 31. The contact blades 33 are oriented so that they extend away from the modular jack assembly 32 and in the direction opposite that of the jack aperture 43. The contact blades 33 are exposed outside the cavity 37 and in the interspace 49 between the top and bottom lip members 39 and 40. As shown, the adapter 30 has eight (8) contact blades 33, which corresponds with a conventional four-pair telecommunications wiring system. However, two, four, six or more blades also may be used to correspond with one, two, three or more pair systems.

The modular jack assembly 32 has a flangeless housing which is preferably composed of flame retardant polyester thermoplastic, or the like, and is designed for direct mounting on the PCB 41. The jack aperture 43 is oriented parallel to the PCB 41 and has eight bent-wire contacts 45 disposed interiorly for mating with a modular plug. However, two, four, six or more contacts may also be utilized depending upon the desired adapter application. The contact wires 45 are preferably constructed of phosphor bronze alloy plated with gold on the contact areas, tin-lead on the solder tails, and nickle on the entire contact surface. An example of such a modular jack assembly is that manufactured by AMP Incorporated, Harrisburg, Pa. The modular jack assembly 32 provides a simple and efficient means of connection to telecommunications equipment, data transmission equipment or related testing and repair equipment for purposes of the adapter device 30.

Figure 8A:
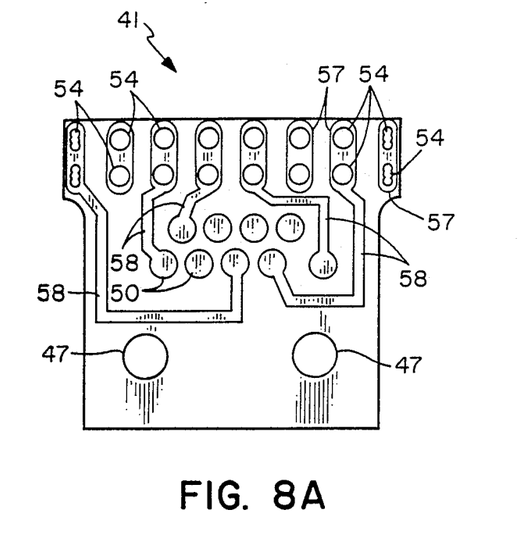
Figure 8B:
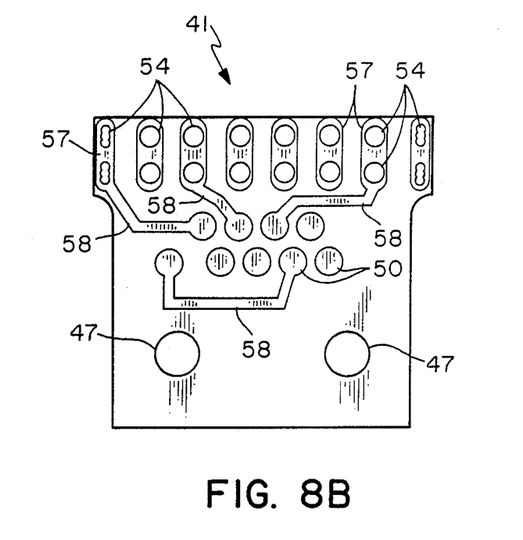
Figure 9A:
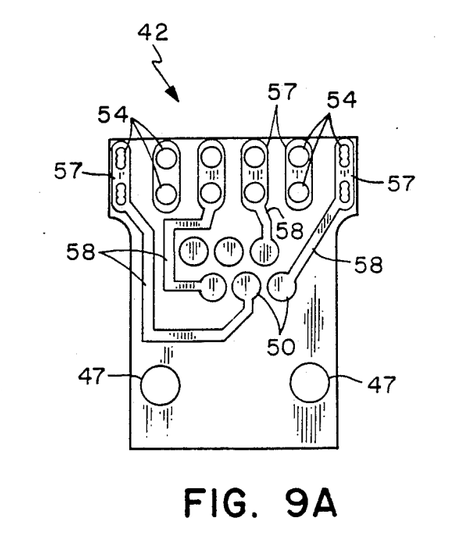
Figure 9B:
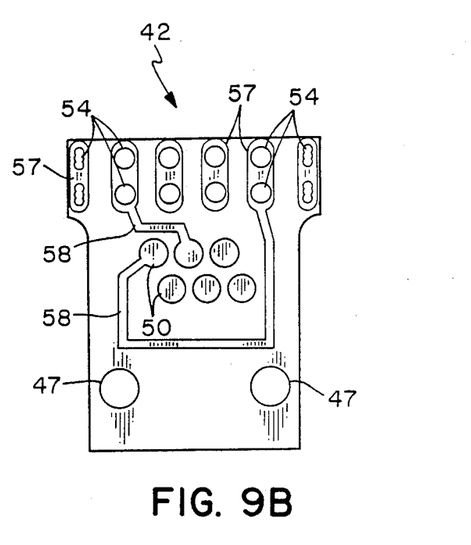

FIGS. 8 A and B show the top and bottom sides, respectively, of one embodiment of the PCB 41 which is useable with an eight blade adapter 30. FIGS. 9 A and B show the top and bottom sides of an alternative PCB embodiment 42 which is useable with a four blade adapter (not shown). The modular jack assembly 32 is mounted on the PCB 41 preferably via snap-in type connection posts 46 (shown in FIG. 4) which extend from the bottom of the modular jack assembly 32 and through apertures 47 in the surface of the PCB 41. Pintype electrical solder tails 48 (see FIG. 4) also extend from the bottom of the modular jack assembly 32 and are communicatively connected to the conductive network 58 of the PCB 41 via connection apertures 50 in the PCB 41. The modular jack assembly 32 extends laterally beyond one edge of the PCB 41 so as to snugly fit within the housing aperture 44.

Figure 6:
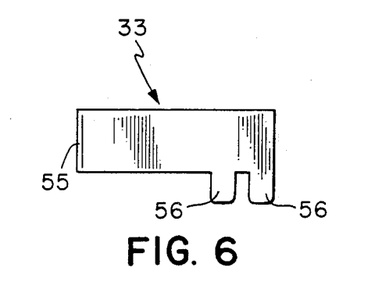
FIG. 6 is a side view of the contact blade of the BIX block adapter.
Figure 7:
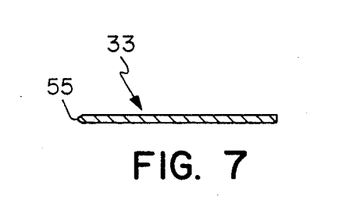
FIG. 7 is a cross-sectional view of the contact blade shown in FIG. 6.

Referring to FIGS. 6 and 7, each contact blade 33 has a generally rectangular configuration, being slightly elongated and substantially flat or planar. Each blade 33 preferably has a tapered tip 55 at its contact end and two blade posts 56 disposed adjacent its other end. The blade posts 56 extend from one edge at a generally right angle to the body of the blade 33. The contact blades 33 are preferably constructed of approximately 0.015 inch (0.38 mm) thick spring-temper phosphor bronze alloy plated with nickle, bright tin, or nickle/gold. Such compositions yield desirable and repeatable electrical connection with minimum resistance for low voltage telecommunications applications.

Referring again to FIGS. 4 and 5, the contact blades 33 are disposed along one side of the PCB 41, opposite the jack aperture 43, and mounted to the edge thereof at contact points 57. Each contact point 57 comprises a pair of apertures 54 in the PCB 41 which receive the blade posts 56 for securement, preferably via solder. The contact points 57 are conductively connected to the connection apertures 50 via the conductive network 58 of the PCB 41. The contact blades 33 extend from the outer edge of the PCB 41 in a parallel fashion, each being uniformly spaced from one another approximately 0.125 inches (3.1 mm) on center, corresponding to the spacing of BIX block electrical contacts. Further, the contact blades 33 are aligned perpendicular to the plane of the surface of the PCB 41 so that they lie on edge approximately 0.19 inches (4.82 mm) in height. In use, the vertically aligned contacts 33 are inserted into the sockets 19 of the BIX block and between the split beams 17 and 18 of the BIX block contacts 16.

Figure 10:
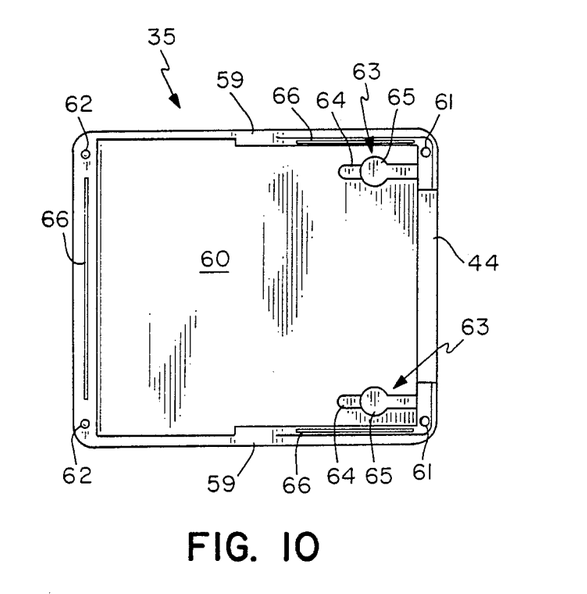
FIG. 10 is a top plan view of the interior side of the housing structure lower member.
Figure 11:
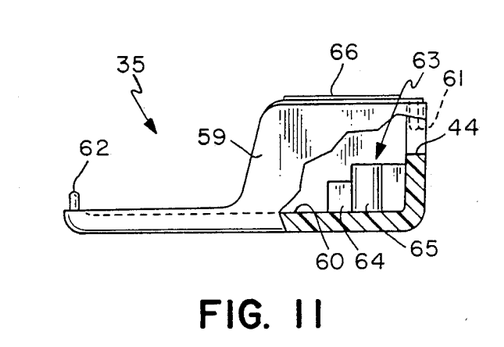
FIG. 11 is a side view of the housing lower member of FIG. 10, shown partially in cross section.
Figure 12:
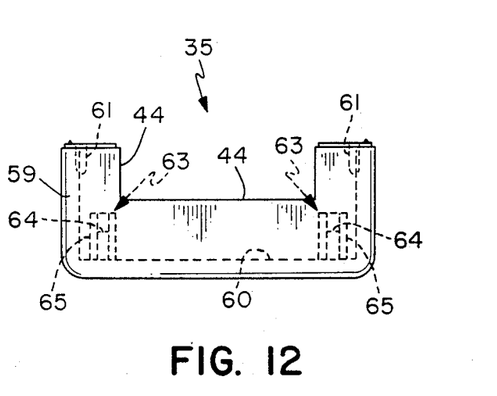
FIG. 12 is an end view of the lower member of FIG. 10.

FIGS. 10–12 show the lower or bottom member 35 of the housing structure 31. The lower member 35 has a rectangular, generally flat exterior surface. The interior surface of the lower member 35 has elevated wall portions 59 which partially surround a shallow, open floor surface 60, and which has a slight ridge on its periphery. Sonic weld projections 66 are shown disposed at predetermined locations on the wall portions 59. A pair of alignment recesses or bores 61 are disposed at corner positions on the wall portions 59 for connection with complimentary post structures on the top member 34 of the housing 31. Additionally, a pair of alignment posts 62 are aligned at predetermined corner positions for connection with complimentary recesses on the top member 34 of the housing 31.

The PCB 41 is disposed within the boundaries of the wall portions 59 and spacially parallel to the floor 60 which has horizontal dimensions generally equivalent to that of the PCB 41. Two printed circuit board supports 63 are shown to extend outwardly from one wall member 59 and raised vertically from the cavity floor 60. The printed circuit board supports 63 each comprise a lower portion 64 and an upper portion 65. As shown in FIG. 4, one edge of the PCB 41 is vertically supported by the lower portions 64 so that it is raised slightly above the cavity floor 60, and thus, its conductive network 58 is elevated from contact therewith. The upper portions 65 horizontally stabilize the PCB 41, particularly when lateral force is exerted thereon (via blades 33) during connection of the adapter 30 to the BIX block 11. Preferably, the upper portion 65 is relatively thick so as to withstand breakage or deformation under such lateral force. As previously discussed, the lower member 35 is connected to the upper member 34 to provide an internal cavity for housing the adapter 30 components.

Figure 13:
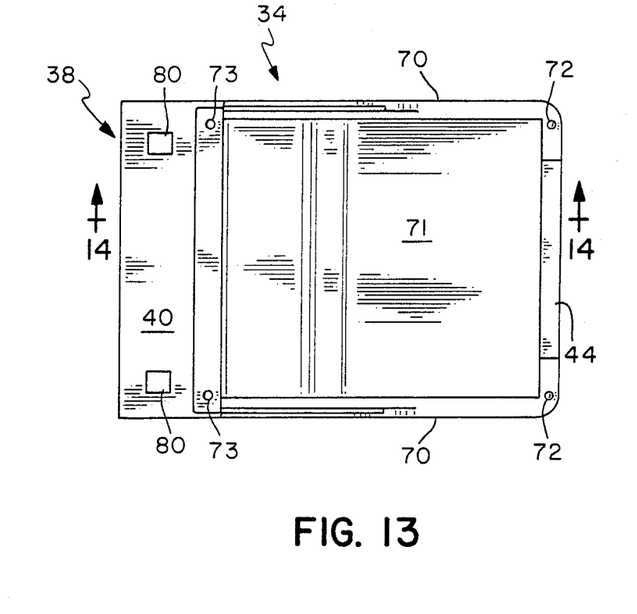
FIG. 13 is a top plan view of the interior side of the housing structure upper member.
Figure 14:
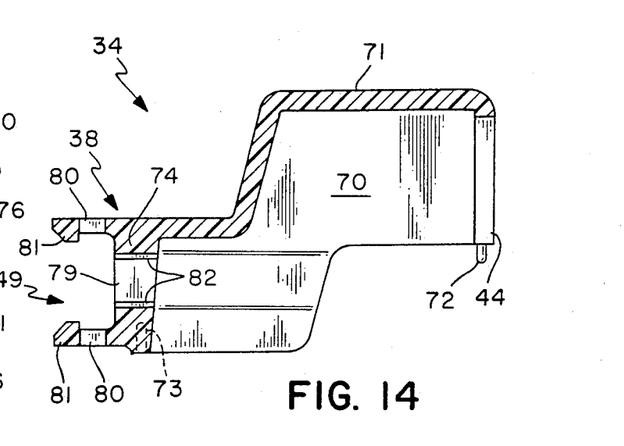
FIG. 14 is a cross sectional view of the housing upper member of FIG. 13, taken along line 14—14 thereof.
Figure 15:
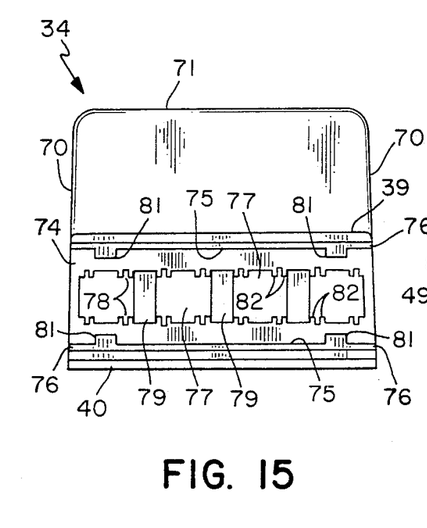
FIG. 15 is a frontal plan view of the upper member of FIG. 13.

Referring to FIGS. 13–15, the upper or top member 34 is shown to have a generally two-tiered configuration which covers the modular jack assembly 32 and portions of the contact blades 33. The upper member 34 has a pair of side walls 70, an angled top surface 71, and a plug extension 38. Housing alignment posts 72 are disposed at predetermined locations on the upper member 34 so as to mate with the alignment recesses 61 of the lower member 35. Similarly, alignment recesses 73 are disposed on the upper member 34 and aligned to connect with the alignment posts 62 of the lower member 35.

The plug extension 38 is generally comprised of a partition wall 74, and the upper and lower lip members 39 and 40. Each lip member 39 and 40 has a flat surface 75 and a beveled edge 76. The beveled edges 76 guide the connection of the adapter 30 to the BIX block. The flat surfaces 75 stabilize and restrict vertical movement of the adapter 30 after it is connected to the BIX block. The partition 74 separates the internal cavity 37 from the plug extension 38 interspace 49. The partition 74 also provides a receptacle structure which accommodates the complementary shape of the BIX block in its mated position, thereby insuring proper alignment and electrical connection of the adapter 30 to the BIX block.

Referring also to FIGS. 3 and 5, the partition 74 is shown to have four (4) spacially aligned reception apertures 77 which receive and engage the intra-pair projections 20 of the BIX block to ensure proper electrical connection, and prevent reversals and transpositions. The partition 74 also has a plurality of opposing and vertically aligned (approximately 0.009 inch (0.22 mm) in width) blade slots or channels 78 which are formed of vertical protrusions 82 from the upper and lower lip members 39 and 40 adjacent each reception aperture 77, and which engage and stabilize the extended contact blades 33. The reception apertures 77 are separated by three (3) wall areas 79 which are integral with the partition 74.

The lip members 39 and 40 of the plug end 38 are further shown to have square connection apertures 80 which engage connection posts 23 on the BIX block, thereby securing the connection between the adapter 30 and the BIX block. Additionally, connection teeth 81 are located immediately forward or anterior to each connection aperture 80, and which are positioned to engage the connection channel 24 on the BIX block for further securement of the mating connection.

The overall structure of the plug extension 38 is designed to provide a stable and reliable electrical connection to a BIX block which is easy and quick to initiate or terminate. The plug extension 38 is vertically defined by the lip members 39 and 40, creating the interspace 49. The interspace 49 has vertical and horizontal dimensions generally coextensive with those of the BIX block segment to which the adapter 30 is connected. Thereby, the extension of the lip members 39 and 40 over the top and bottom surfaces of the inserted BIX block restricts vertical movement of the adapter 30 and thus increases connection stability. The partition wall 74 provides a mating structure which compliments the inserted face of the BIX block. This mating structure aligns the contact blades 33, which extend from the interior cavity 37 horizontally through the blade channels 78 to the interspace 49, for electrical connection with the contacts of the BIX block.

In summary, the device 30 of this invention is connected directly to a BIX block by inserting the plug end 38 on the BIX block as previously discussed. Modular connections are then made via the jack aperture 43. The modular connections provided by the adapter 30 allows a user to conveniently install or repair telephone equipment from the BIX block. It can also be used to test new cable installations or to isolate problems in existing telephone service. The adapter 30 is useable with one, two, three, four or more pair modular plugs. The adapter 30 allows a user to modularly connect from a BIX block to KEY and PBX common equipment or to connect directly to a set with a four-pair base cord or the like. The device 30 provides a means of establishing half-taps for cut over purposes. It also allows conversion of the BIX block to a modular patch panel, thus enabling a user to change his own cross connects. Importantly, the adapter is unitary and compact; thus, multiple adapters may be used simultaneously on a single BIX block.

As many changes are possible to the embodiments of this invention utilizing the teachings thereof, the descriptions above, and the accompanying drawings should be interpreted in the illustrative and not the limited sense.

That which is claimed is:

1. A telecommunications adapter for connecting a modular connector to the mating end of a BIX-type block terminal, comprising:
   a. a modular electrical connector having bent wire leads terminating in connection means;
   b. a printed circuit board having a conductive network and being communicatively connected to said modular connector via said connection means;
   c. a plurality of planar contact blades mounted to said printed circuit board and being communicatively connected to said modular connector via said conductive network; and
   d. a housing structure having a central cavity enclosing said printed circuit board, said modular connector and said blades, said central cavity having a central aperture exposing said modular connector for connection, and a plug end portion exposing said contact blades outside said housing structure and being connectible to the BIX-type block terminal, said plug end having a partition area having a plurality of apertures receptive of mating projections on the BIX-type block terminal, said partition area further having a plurality of slots for extension of said blades from said central cavity, and means for supporting and stabilizing the adapter when connected to the BIX-type block terminal.

2. The telecommunications adapter of claim 1, wherein said plug end apertures are linearly aligned and separated a predetermined distance from one another by a segment of said partition area, and wherein each said slot is defined by two parallel protrusions in said apertures, said protrusions being closely spaced a predetermined distance from each other.

3. The telecommunications adapter system of claim 1, wherein said support and stabilizing means comprises top and bottom spacially parallel extension members integrally formed with said housing structure at said plug end, and providing an interspace therebetween enclosing said extended portions of said contact blades.

4. A telecommunications interface adapter system, comprising:
   a. modular connection means;
   b. a housing structure enclosing said modular connection means and having a central cavity and a tapered plug end, said plug end having a receptacle structure for connection to the telecommunications interface, said receptacle structure further including a channel structure;
   c. a plurality of upstanding conductive blades spaced a predetermined distance apart and extending from said central cavity through said channel structure to the exterior of said housing structure at said plug end, so that portions of said blades are exposed for mating contact with the telecommunications interface; and
   d. a printed circuit board having means to electrically connect said modular connection means and said blades, said printed circuit board being located in said central cavity.

5. The telecommunications interface adapter system of claim 4, wherein said housing structure is a bifurcated structure having a top member and a bottom member, said top and bottom members being coupled via a sonic fusion process.

6. The telecommunications interface adapter system of claim 4, wherein said modular connection means is a modular jack assembly.

7. The telecommunications interface adapter system of claim 6, wherein said modular jack assembly is exposed for mating via an aperture in said housing structure.

8. The telecommunications interface adapter system of claim 4, wherein said housing structure is generally cube-shaped and wherein said plug end extends planarly therefrom.

9. The telecommunications interface adapter system of claim 8, wherein said plug end is constructed and arranged to mate with a BIX-type block telecommunications interface.

10. The telecommunications interface adapter system of claim 9, wherein said receptacle structure is a partition area, and wherein said channel structure comprises a plurality of apertures receptive of mating projections on the BIX-type telecommunications interface, each said aperture having a plurality of spacially aligned slots engaging said blades.

11. The telecommunications interface adapter of claim 10, wherein said apertures are linearly aligned and separated a predetermined distance from one another by a segment of said partition area, and wherein each said slot is defined by two parallel protrusions in said apertures, said protrusions being closely spaced a predetermined distance from each other.

12. The telecommunications interface adapter system of claim 9, further comprising means for supporting and stabilizing the adapter system in operative connection to the telecommunications interface.

13. The telecommunications interface adapter system of claim 12, wherein said support and stabilizing means comprises top and bottom spacially parallel extension members integrally formed with said housing structure at said plug end, and providing an interspace therebetween enclosing said exposed portions of said blades.

14. The telecommunications adapter of claim 13, wherein said extension members have connection recesses for engaging connection posts on the BIX-type telecommunications interface, and connection teeth for engaging a connection channel on the BIX-type telecommunications interface.

15. The telecommunications interface adapter system of claim 9, wherein each said blade has a substantially planar configuration with a tapered tip at one end and means for mounting said blade to said printed circuit board at its other end.

16. The telecommunications interface adapter system of claim 15, wherein said contact blades are constructed of hardened spring temper phosphor bronze alloy, coated with a substance selected from the group consisting of nickle, nickle/gold, and bright tin.

17. The telecommunications interface adapter system of claim 15, wherein said blades are aligned vertically through said channel structure and extend horizontally beyond the perimeter of said printed circuit board.

18. The telecommunications interface adapter system of claim 17, wherein said modular connection means has a connection port arranged spacially parallel to said printed circuit board, and wherein said blades extend from said printed circuit board opposite said connection port.

19. The telecommunications interface adapter system of claim 18, wherein said housing structure has means for supporting and stabilizing said printed circuit board in said central cavity, said means for supporting and stabilizing said printed circuit board including at least one ledge structure integrally formed with said housing structure at a predetermined location and having a lower portion contacting said printed circuit board at a bottom side thereof, and an upper portion contacting said printed circuit board at a rear edge thereof, whereby said printed circuit board is horizontally stabilized by said upper portion during connection of said adapter system to a telecommunications interface.

20. A unitary and compact adapter useable in the telecommunications field for connecting a modular connector to a BIX-type block interface terminal having electrical contacts, and mating projections, said adapter comprising:
  a. a modular electrical jack assembly having bent wire leads terminating in solder tails;
  b. a rectilinear printed circuit board communicatively connected to said modular jack via said solder tails and having a conductive network;
  c. an array of separated and spacially parallel, upstanding contact blades vertically mounted to one side of said printed circuit board a predetermined distance from each other, said contact blades extending horizontally beyond the periphery of said printed circuit board, said con tact blades being communicatively connected to said modular jack via said conductive network; and
  d. a housing structure having a central cavity enclosing said printed circuit board and said modular jack assembly, a posterior aperture in said central cavity exposing said modular jack for external connection, and a rectilinear, generally planar, and tapered plug extension structure having a partition segment separating said central cavity from the exterior of the adapter and including an array of slots for extension of a portion of each said blade from the central cavity for communicative connection with the electrical contacts of the BIX-type block, and apertures for reception of the mating projections of the BIX-type block, said plug extension structure further having a pair of spacially parallel lip members creating an interspace enclosing said extended blade portions and being for stabilized engagement with the BIX-type block, said plug extension structure being connectible to the BIX-type block for electrical communication therewith.

* * * * *